Oct. 31, 1950     W. P. MUNK     2,528,448
OIL AND GAS SEPARATOR
Filed Sept. 4, 1945
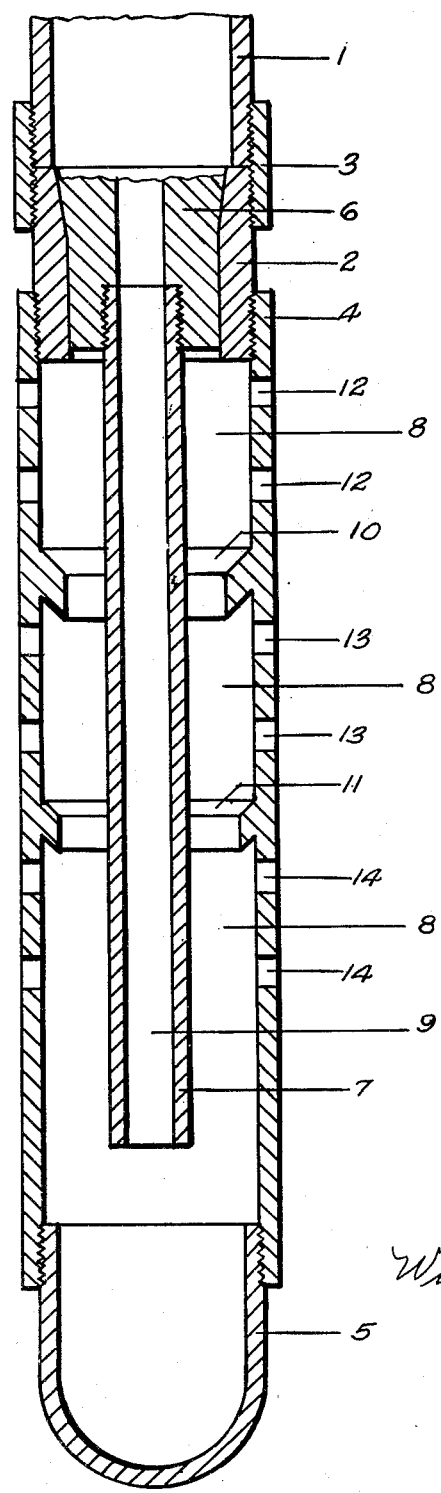
William Paul Munk.
INVENTOR

UNITED STATES PATENT OFFICE 2,528,448

OIL AND GAS SEPARATOR

William Paul Munk, San Francisco, Calif.

Application September 4, 1945, Serial No. 614,291

1 Claim. (Cl. 103—203)

This invention relates to oil and gas separators for use in oil wells.

This application is filed as a continuation in part of my Patent 2,386,564, October 9, 1945, and entitled Oil and Gas Separator.

This invention has for a primary object means and method for separating gas from oil, particularly in oil wells, during the pumping of the oil.

A further object of this invention is to provide an oil and gas separator that is simple in construction yet effective in operation.

Another object of this invention is to provide, in oil and gas separators of the type employing a down-pass space for oil and gas separation and an up-pass space for pump fluid, a construction that avoids the use of pipes in the down-pass space enabling a full transverse area down-pass space to be provided and yet eliminate turbulence and gas locking and provide orderly separation action.

And a further object of this invention is to provide, in oil and gas separators of the types having down-pass spaces for oil and gas separation, a construction which is adaptable to all types of the above mentioned separators.

Other objects and advantages of my invention will appear as the specification proceeds.

For a better understanding of my invention, reference should be had to the accompanying drawing, in which drawing the figure is a vertical sectional view illustrating one form of my improved oil and gas separator.

In the figure of the drawing—the means to accomplish the separation of the oil from the gas may comprise—

1, a fragmentary portion of the usual well tubing or eduction pipe.

2 is a shoe attached to the lower end of the tubing 1 by the usual tubing coupling 3.

4 is a separator barrel having internal threads at its upper and lower ends. The upper internal threads secure the separator barrel 4 to shoe 2, while the lower threads receive the plug 5.

6 is a hold down for a standing valve or a pump and attached thereto and suspended therefrom is a flow pipe 7.

Flow pipe 7, with separator barrel 4, forms the down-pass space 8 for oil and gas separation, and also the up-pass space 9 for pump fluid, all within the barrel 4.

10 is an upper or first annular baffle plate in down-pass space 8 and attached to the inner wall of the separator barrel 4. The inside diameter of baffle plate 10 is greater than the outside diameter of flow pipe 7.

11 is a lower or second annular baffle plate in down-pass space 8 and is also attached to the inner wall of the separator barrel 4. The inside diameter of baffle plate 11 is enlarged as compared to the inside diameter of baffle plate 10.

Baffle plates 10 and 11 provide in down-pass space 8 an upper or first section above baffle plate 10, an intermediate or second section between baffle plates 10 and 11 and a lower or third section below baffle plate 11, and the difference of the inside diameter of baffle plate 10 as compared to the outside diameter of flow pipe 7 provides a first passage between baffle plate 10 and flow pipe 7 to communicate the upper or first and the intermediate or second sections of the down-pass space 8, while the difference of the inside diameter of the baffle plate 11 as compared to the outside diameter of flow pipe 7 provides a second passage between baffle plate 11 and flow pipe 7 to communicate the intermediate or second and the lower or third sections of the down-pass space 8.

12, 13 and 14 are openings or perforations, through separator barrel 4 above, between and below baffle plates 10 and 11, serving to communicate the well and down-pass space 8.

In action, fluid or oil and gas entrained in the oil enters through perforations 12 from the space (not shown) between the casing (not shown) and separator barrel 4 into the uppermost or first section of down-pass space 8. Separation of gas and oil occurs and gas vents through the uppermost of the perforations 12 and back to the well, eventually to pass up in the space (not shown) between the casing (not shown) and the tubing 1 and out the casing head (not shown). The specific gravity of the fluid in this space (uppermost or first section of down-pass space 8) has been changed, due to separation of gas from the oil and venting of the gas, and, the fluid, now being heavier, flows downwardly in the aforementioned space. Baffle plate 10 deflects the downwardly moving fluid and in cooperation with the first passage directs it onto the outer wall of flow pipe 7. Adhesive forces and gravity action cause the fluid to cling to and to flow downwardly on the outer wall of flow pipe 7 in the upper portion of the intermediate or second section of down-pass space 8 below baffle plate 10, the fluid, upon further downward movement below baffle plate 10, also being subjected to cohesive forces, which cause the oil portion of the fluid to be drawn toward the outer wall of flow pipe 7 while the gas portion of the fluid is forced away from the outer wall of flow pipe 7. Simultaneously fluid enters through the intermediate openings 13 into the intermediate or second section of down-pass space 8 to join with and be carried downwardly by the fluid moving downwardly on the outer wall of flow pipe 7.

The fluid moving downwardly in the intermediate or second section of down-pass space 8 (especially that fluid nearest to the inner wall of separator barrel 4) upon reaching baffle plate 11 is deflected by baffle plate 11 and by baffle plate 11 in cooperation with the second passage is directed onto the outer wall of flow pipe 7 and clings to and moves downwardly on the outer wall of flow pipe 7 in the upper portion of the lower or third section of down-pass space 8 by reason of the adhesive and gravity forces mentioned earlier herein.

As mentioned earlier herein, the inside diameter of baffle plate 11 is enlarged as compared to baffle plate 10, whereby the space (second passage) between the baffle plate 11 and the flow pipe 7 is enlarged or of greater transverse area as compared to the space (first passage) between baffle plate 10 and flow pipe 7, and thus ample area is provided for the passage of not only the fluid from the uppermost section of the down-pass space 8, but also that fluid from the intermediate section of the down-pass space 8 as well.

Upon further downward movement below baffle plate 11 the fluid is again subjected to cohesive forces, as disclosed earlier herein, and further separation of the gas and oil portion of the fluid takes place. Simultaneously fluid enters through the uppermost of the perforations 14 and into the lowermost or third section of the down-pass space 8 to join with and be carried downwardly with fluid flowing downwardly on the outer wall of flow pipe 7. At this point it may be said that the fluid is again subjected to cohesive forces which cause the oil portion of the fluid to move inwardly toward flow pipe 7, while the gas portion of the fluid separates toward and is finally displaced through the lowermost perforations 14 and is thus vented back to the well. Because of the action just described hereinabove it will be readily seen that gas locking in the lower and intermediate sections of the down-pass space 8 is avoided. And further, because of the plural baffle plate construction, entrance of fluid from the well through the perforations 13 and also the uppermost perforations 14 and into down-pass space 8 and the venting of gas through the lowermost perforations 14 and back to the well are thus facilitated, for the reason that there is no relatively thick film of oil, as in ordinary separators, flowing downwardly on the inner wall of separator barrel 4 and through which incoming fluid and outgoing gas would have to pass during the separating operation.

My plural baffle plate construction also permits orderly separation of the gas from the oil, avoids turbulence and also eliminates gas locking. This is so by reason of the fluid coursing downwardly (due to adhesive and gravity forces) on the outer wall of flow pipe 7 as disclosed earlier herein, so that gas, such as may still be entrained in the oil and ready for further separation from the oil and venting back to the well, is positioned (due to cohesive forces between the oil molecules and cohesive forces between the gas molecules) between the heavier fluid, coursing downwardly on the outer wall of flow pipe 7 and the separator barrel 4, and therefore is free to move through the lowermost perforations 14 and back to the well, there being no relatively thick obstructive film of oil on the inner wall of separator barrel 4. This construction, it is also seen, eliminates the use of pipes in the down-pass space 8 and thereby permits a full transverse-area down-pass space required for the satisfactory handling of extremely large volumes of gassy fluid.

While I have shown but two baffle plates with my separator, I wish that it be understood that more than two baffle plates may be employed to improve the all around efficiency of my separator. It will be noted that with two baffle plates but three perforated barrel section (barrel sections having perforations 12, 13 and 14) are employed; however, if three baffle plates are employed four perforated barrel sections will be required, and if four baffle plates are employed five perforated barrel sections will be required, etc. And, further, when three baffle plates are employed the transverse areas of the spaces between the baffle plates and the flow pipe 7 are varied, the transverse area of that space between the uppermost of the baffle plates and the flow pipe 7 being of least transverse area, the transverse area of that space between the intermediate baffle plate and the flow pipe 7 being greater in transverse area as compared to that space between the uppermost baffle plate and the flow pipe 7, while the transverse area of the space between the lowermost baffle plate and flow pipe 7 being greater than either of the aforementioned spaces between the aforementioned baffle plates and flow pipe 7. The above given rule is carried out in separators having four or more baffle plates, as should be readily understood.

The invention is susceptible to many changes, variations and usages and this may be done without departing from the spirit of the invention. In this respect I desire to make reference to my separator improvement as of my co-pending Patent No. 2,386,564, October 9, 1945, said separator (Figures 1 to 4) being modifiable to improve its all around efficiency by use of my plural baffle plate construction—two more of my improved baffle plates—in the down-pass oil and gas separator space, those versed in the art readily understanding that that can be done.

In my aforementioned co-pending Patent 2,386,564 the members and spaces of the Figure 1 of the drawing, bearing the numerals 1 to 9, inclusive, are similar to the members and spaces 1 to 9, inclusive, respectively, in the figure of drawing of the present application. The action of the fluid above baffle plate 10 and below baffle plate 11 in combination with perforations 12 and 14 of the present application is similar to that, in my aforementioned co-pending Patent 2,386,-564, above and below the baffle plate 10 in combination with perforations 11 and 12, respectively. This is also so in connection with the baffle plate 14 in combination with the perforations 11 and 12 in the barrel 15 of the Figure 2 of the aforementioned Patent 2,386,564. In the Figures 3 and 4 of the aforementioned Patent 2,386,564 tubes 18 provide spaces 22 and 23 in the barrel 4 which spaces are similar in action to the spaces 8 and 9 of the present application and the action of the fluid movement (Figures 3 and 4 of my co-pending Patent 2,386,564) above and below baffle plate 10 in combination with perforations 11 and 12 is similar to that of the present application above baffle plate 10 and below baffle plate 11 in combination with perforations 12 and 14, respectively. In the aforementioned Patent 2,386,564 the specification also disclosed the idea of two or more baffle plates and three or more perforated barrel sections the difference between that patent and the present application lies in the construction of the baffle plates.

By having a construction in down-pass space 8 of the present application (the baffle plates 10 and 11 and the first and second passages, as disclosed earlier herein), ample area for the downward movement of the fluid from the various sections of down-pass space 8 and means to direct the downwardly moving fluid onto the outer wall of flow pipe 7 is not only provided, but the fluid (from the second or intermediate space between baffles 10 and 11) is also directed onto the outer wall of flow pipe 7 as a layer of fluid over a layer of fluid (from the first or upper section of down-pass space 8) moving downwardly on the outer wall of flow pipe 7. By so doing agitation of the fluid (moving from the various sections of down-pass space 8 onto the outer wall of flow pipe 7) is kept at a minimum so that re-mixing of the separated gas with the oil portion of the fluid as the fluid courses downwardly on the outer wall of flow pipe 7 is kept at a minimum and the separation of the entrained gas from the oil portion of the fluid by the aforementioned cohesive forces is thus facilitated. The above noted action with the separator of the present application cannot be secured in the separator of my co-pending Patent 2,386,564 because of the lack of variation in the baffle plate construction and the passages between the baffle plates and the tube 7 of that patent.

I claim:

A deep well oil and gas separator, comprising: a separator barrel; a tube in said separator barrel; a down-pass space for separation of gas from oil and located between said tube and said separator barrel; an up-pass space for pump fluid and located in said tube; a first annular baffle plate in said down-pass space and a second annular baffle plate in said down-pass space below said first annular baffle plate, said annular baffle plates being adapted to cooperate with said separator barrel to divide said down-pass space into an upper section above said first baffle plate, an intermediate section between said baffle plates and a lower section below said second baffle plate, said annular baffle plates being spaced from said tube to provide a first annular passage between said first annular baffle plate and said tube and a second annular passage between said second annular baffle plate and said tube, said first annular passage placing the bottom of the upper section of said down-pass space in communication with the top of the intermediate section of said down-pass space in such manner that fluid moving downwardly from the upper section of said down-pass space is directed onto the outer wall of the portion of said tube in the upper portion of the intermediate section of said down-pass space, and said second annular passage placing the bottom of the intermediate section of said down-pass space in communication with the top of the lower section of said down-pass space in such manner that fluid moving downwardly from the intermediate section of said down-pass space is directed onto the outer wall of the portion of said tube in the upper portion of the lower section of said down-pass space; openings in said separator barrel above, between and below said baffle plates, said openings placing the upper, the intermediate and the lower sections of said down-pass space in communication with the space exterior to said separator barrel; and the improvement which comprises having said second annular baffle plate of a greater inside diameter than said first annular baffle plate whereby the transverse area of said second passage is made greater than the transverse area of said first passage.

WILLIAM PAUL MUNK.

REFERENCES CITED

The following references are of record in the file of this patent:

UNITED STATES PATENTS

| Number | Name | Date |
|---|---|---|
| 2,029,323 | Jones | Feb. 4, 1936 |
| 2,104,339 | Arutunoff | Jan. 4, 1938 |
| 2,386,564 | Munk | Oct. 9, 1945 |